F. L. MORGAN.
RAIL JOINT FASTENING.
APPLICATION FILED OCT. 5, 1911.

1,059,193.

Patented Apr. 15, 1913.

WITNESSES
M. Ray Taylor
A. A. Hammond

INVENTOR
Francis L. Morgan
by C. A. Brandenburg
his Attorney

UNITED STATES PATENT OFFICE.

FRANCIS LEONARD MORGAN, OF ROCKMART, GEORGIA.

RAIL-JOINT FASTENING.

1,059,193.  Specification of Letters Patent.  Patented Apr. 15, 1913.

Application filed October 5, 1911. Serial No. 652,917.

*To all whom it may concern:*

Be it known that I, FRANCIS L. MORGAN, a citizen of the United States, residing at Rockmart, in the county of Polk and State of Georgia, have invented certain new and useful Improvements in Rail-Joint Fastenings, of which the following is a specification.

My invention relates to an improvement in rail joint fastenings, and the object is to provide simple means for fastening the nuts from movement on the bolts which pass through the fish plates for securing the ends of the rail together.

The invention consists in certain novel features of construction and combinations of parts which will be hereinafter fully described and pointed out in the claim.

Figure 1:
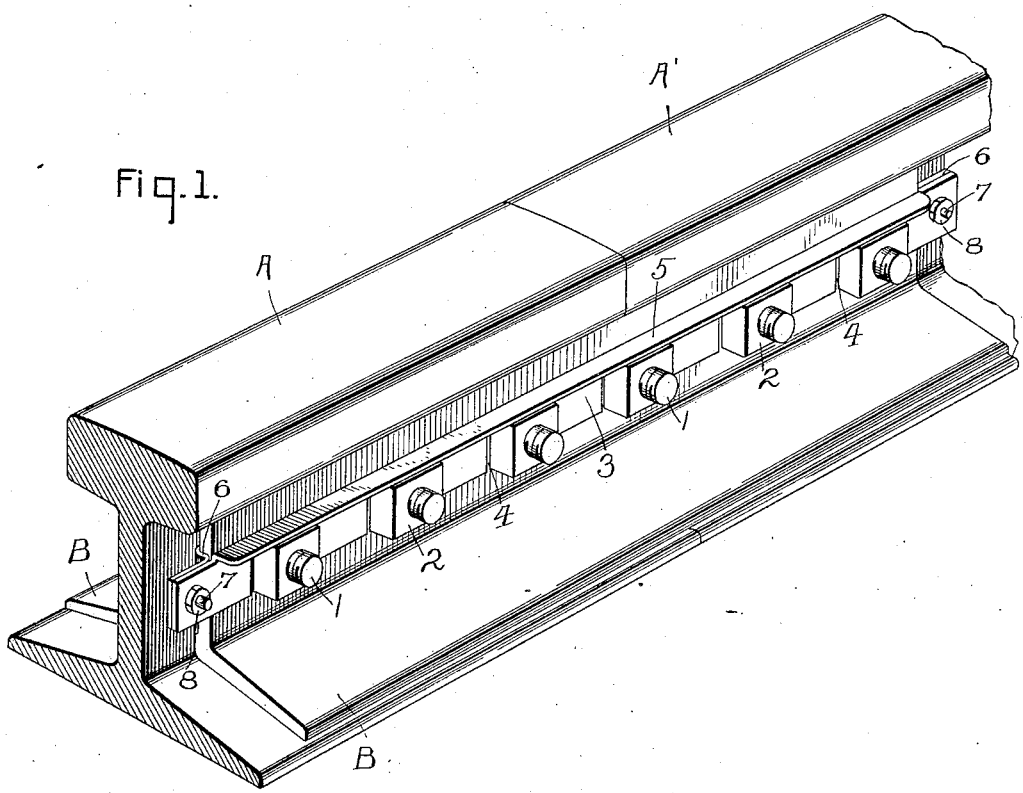
Figure 2:
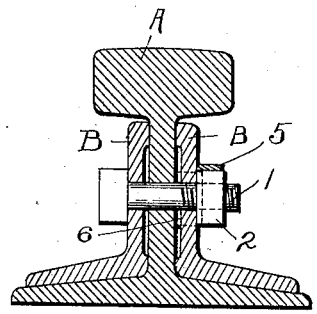

In the accompanying drawings, Figure 1 is a perspective view; and Fig. 2 is a detail sectional view.

A, and A' represent the two rails, and B represents the fish plates. The usual bolts 1 are passed through the fish plates and rails, and nuts 2 are screwed upon the bolts for fastening the rails and fish plates together, whereby the two rails are securely held. A locking bar 3 having notches 4 formed therein, is mounted upon the fish plate, having the notches 4 engaging the sides of the nuts, and a flange 5 on the bar resting upon the upper surfaces of the nuts, whereby the nuts will be prevented from movement. Clips 6 are held between the fish plate and rails at each end of the fish plate, and the ends of the clips are connected to the ends of the locking bar, which preferably extend at an angle from the fish plate, by means of bolts 7 passing through the clips and angular portions of the locking bar. Nuts 8 are screwed upon the bolts, whereby the clips and locking bar will be securely connected together, and the locking bar prevented from movement or removal, thereby forming at all times a locking means for preventing any rotary movement of the nuts 2.

From the foregoing it will be seen that I have provided a very simple means of fastening the nuts from movement, which means can be readily assembled at any time for the removal of a rail or fish plate.

Having fully described my invention, what I claim as new and desire to secure by Letters Patent, is:—

In a rail joint fastening, the combination with rails and fish plates having bolts passing therethrough and nuts on the bolts, of a removable locking bar having notches formed therein which are fitted over the nuts, a flange on the locking bar resting upon the nuts, clips held between the fish plate and rails, said clips bent at right angles at the outer ends thereof and then bent parallel to the locking bar so that the outer ends of the clips lie against the locking bar forming a space between the ends of the clips and the rails, bolts passing through the ends of the clips and locking bar, and nuts on the bolts for fastening the clips and bar together, the space formed between the clips and rails permitting of the insertion of the bolts through the clips and bar.

In testimony whereof I affix my signature, in the presence of two witnesses.

FRANCIS LEONARD MORGAN.

Witnesses:
GEO. DOUSLEY,
H. F. JOYNER.

Copies of this patent may be obtained for five cents each, by addressing the "Commissioner of Patents, Washington, D. C."